US011204090B2

United States Patent
Vriesen et al.

(10) Patent No.: US 11,204,090 B2
(45) Date of Patent: Dec. 21, 2021

(54) HOUSING COMPONENT HAVING A FLANGE WITH MICROSTRUCTURE

(71) Applicant: Flender GmbH, Bocholt (DE)

(72) Inventors: Johannes Vriesen, Bocholt (DE); Alfons Böing, Hamminkeln (DE)

(73) Assignee: FLENDER GMBH, Bocholt (DE)

( * ) Notice: Subject to any disclaimer, the term of this patent is extended or adjusted under 35 U.S.C. 154(b) by 326 days.

(21) Appl. No.: 16/241,679

(22) Filed: Jan. 7, 2019

(65) Prior Publication Data

US 2019/0211913 A1 Jul. 11, 2019

(30) Foreign Application Priority Data

Jan. 8, 2018 (EP) .................................. 18150583

(51) Int. Cl.
| | | |
|---|---|---|
| *F16H 57/025* | (2012.01) | |
| *F16H 57/08* | (2006.01) | |
| *B23C 3/34* | (2006.01) | |
| *B23B 3/26* | (2006.01) | |
| *B23K 26/352* | (2014.01) | |

(Continued)

(52) U.S. Cl.
CPC .......... *F16H 57/025* (2013.01); *B23B 3/265* (2013.01); *B23C 3/34* (2013.01); *B23K 26/352* (2015.10); *B23K 26/355* (2018.08); *B23K 26/3584* (2018.08); *F16H 57/02* (2013.01); *F16H 57/082* (2013.01); *B23C 3/00* (2013.01); *B23C 2220/36* (2013.01); *B23K 2101/04* (2018.08); *F16B 2200/50* (2018.08); *F16H 57/029* (2013.01); *F16H 57/032* (2013.01);

(Continued)

(58) Field of Classification Search
CPC ... B23K 26/355; F16H 57/025; F16H 57/082; F16H 2057/02017; B23B 3/265; B23C 3/34

See application file for complete search history.

(56) References Cited

U.S. PATENT DOCUMENTS

| | | |
|---|---|---|
| 6,253,640 B1 | 7/2001 | Phillips |
| 2005/0075211 A1 | 4/2005 | Fox et al. |

(Continued)

FOREIGN PATENT DOCUMENTS

| | | |
|---|---|---|
| CN | 104048124 A | 9/2014 |
| CN | 104676154 A | 6/2015 |

(Continued)

OTHER PUBLICATIONS

Forschungsreport 2014: "Gestaltung und Ermittlung charakteristischer Kennwerte von relbschlussoptimierten Oberflächen". Projekt GECKO, chapter 4, Simulation von Mikrostrukturen, pp. 1-37; 2014.

*Primary Examiner* — Thomas C Diaz

(74) *Attorney, Agent, or Firm* — Henry M. Feiereisen LLC

(57) ABSTRACT

A housing component includes a flange defining a center point and having an end face formed with microstructures in a first region and a second region to increase a local friction coefficient. The microstructures have each a blade shape with a cutting line, the cutting line in the first region being arranged concentrically about a first local center point, and the cutting line in the second region being arranged concentrically about a second local center point. The first and second local center points have different radial distances from the center point of the flange.

16 Claims, 5 Drawing Sheets

(51) Int. Cl.
   *F16H 57/02*      (2012.01)
   *B23K 101/04*     (2006.01)
   *F16H 57/029*     (2012.01)
   *F16H 57/032*     (2012.01)
   *B23C 3/00*       (2006.01)

(52) U.S. Cl.
   CPC .......... *F16H 2057/02008* (2013.01); *F16H 2057/02017* (2013.01); *F16H 2057/02078* (2013.01)

(56) References Cited

U.S. PATENT DOCUMENTS

| 2007/0140785 | A1* | 6/2007  | Abeln ................. F16B 4/00 403/282 |
| 2010/0042206 | A1* | 2/2010  | Yadav ................. A61L 31/10 623/1.42 |
| 2011/0116931 | A1  | 5/2011  | Dessoly et al. |
| 2011/0142649 | A1* | 6/2011  | Ramanujam ........... F03D 15/10 416/170 R |
| 2012/0322607 | A1  | 12/2012 | Noller et al. |
| 2013/0340566 | A1  | 12/2013 | Kleine-Brockhoff et al. |
| 2016/0138718 | A1  | 5/2016  | Lee et al. |

FOREIGN PATENT DOCUMENTS

| CN | 204664681 U    | 9/2015 |  |
| CN | 206669164 U    | 11/2017 |  |
| DE | 10225708 A1    | 2/2004 |  |
| DE | 102011104291   | 12/2012 |  |
| DE | 102012012140   | 12/2013 |  |
| JP | 61174280 A *   | 8/1986  | ......... B29C 37/0082 |
| WO | WO 2006128523 A1 | 12/2006 |  |
| WO | WO 2010005790 A2 | 1/2010 |  |

\* cited by examiner

HOUSING COMPONENT HAVING A FLANGE WITH MICROSTRUCTURE

CROSS-REFERENCES TO RELATED APPLICATIONS

This application claims the priority of European Patent Application, Serial No. 18150583.5, filed Jan. 8, 2018, pursuant to 35 U.S.C. 119(a)-(d), the disclosure of which is incorporated herein by reference in its entirety as if fully set forth herein.

BACKGROUND OF THE INVENTION

The present invention relates to a housing component, to a method for the production thereof, to a housing provided with such a housing component and to a planetary gear set provided with such a housing.

The following discussion of related art is provided to assist the reader in understanding the advantages of the invention, and is not to be construed as an admission that this related art is prior art to this invention.

For example in the field of gear sets for wind power installations, attempts are underway to realize a transfer of higher torques and powers through gear sets which are structurally more compact so as to adapt a present rotational speed. Such a power increase relative to structural space places greater demands on all components of the gear set. In particular, there is a requirement for housing components which, despite increasing mechanical load at their flange surfaces, are seated firmly together, i.e. exhibit no relative movement or only reduced relative movement.

It would therefore be desirable and advantageous to provide an improved housing component to obviate prior art shortcomings and to enable easy, quick and economical production thereof.

SUMMARY OF THE INVENTION

According to one aspect of the present invention, a housing component includes a flange defining a center point and having an end face formed with microstructures in a first region and a second region to increase a local friction coefficient, the microstructures having each a blade shape with a cutting line, the cutting line in the first region being arranged concentrically about a first local center point, and the cutting line in the second region being arranged concentrically about a second local center point, the first and second local center points having different radial distances from the center point of the flange.

In accordance with the present invention, the flange of the housing component is designed to create a frictional flange connection with a further housing component. The flange has an end face which is essentially designed as a plane circumferential surface. The flange has a plurality of openings, which are designed to accommodate removable fastening elements such as screws or bolts, for example. A plurality of microstructures is formed in each of a first region and a second region on the end face of the flange. An increase of the local friction coefficient is present in locations at which microstructures are formed in the first region and/or second region. The local friction coefficient is the friction coefficient which, together with a retention force that is exerted via the fastening element in the flange connection, defines the sticking friction that is present in the plane of the end face. The microstructures essentially have a blade shape with a cutting line. By virtue of this shape, the microstructures bring about a direction-dependent increase of the local friction coefficient.

In accordance with the present invention, the cutting lines of the microstructures are arranged and aligned concentrically about a first local center point in the first region. The first local center point describes a point which lies on the end face of the flange or radially close to the end face of the flange and which forms a geometric center for a plurality of cutting lines. Likewise, the cutting lines of the microstructures in the second region are arranged and aligned concentrically about a second local center point, which also lies on the end face of the flange or radially close to the end face of the flange. The first and the second local center points have different radial distances relative to a flange center point. Consequently, the cutting lines of the microstructures in the first and second region have different alignments relative to a border of the end face.

As a result of the direction-dependent effect of the microstructures on the increase of the local friction coefficient, different and significantly increased local friction coefficients are present in the first and second regions. By means of positioning the first and second local center points in a suitable manner, it is therefore possible to achieve an increased sticking friction in selectable sections of a flange connection. The increased sticking friction makes it possible to prevent relative movement of the housing components in the flange connection in sections under significant mechanical load. At the same time, the flange connection which is thereby improved also ensures an improved seal at the flange. This allows a more resilient flange connection to be produced.

A housing component according to the present invention therefore has at the end face of the flange, as a result of processing the end face, an alignment of the microstructures which can be set in a locally specific manner. This results in an anisotropic i.e. direction-dependent distribution of local friction coefficients at the flange connection, wherein the distribution can be set in a locally specific manner during processing of the end face. In the claimed housing component, the first and second local center points are therefore specifically positioned for a specific setting of an anisotropic distribution of local friction coefficients. The setting of the anisotropic distribution makes it possible to achieve a higher sticking friction in the flange connection.

According to another advantageous feature of the present invention, the microstructures in the first region and/or second region may at least partly formed as rotation bands which are left behind by a milling cutter during the machining of a metallic surface. Rotation bands have dimensions of up to 100 µm perpendicular to an end face of a flange and therefore represent microstructures. Rotation bands also form an essentially blade-shaped contour and offer a simple way of producing the microstructures. Moreover, rotation bands essentially form concentric circular curves. The end face of the flange of the claimed housing component can therefore be produced quickly and economically. Alternatively or additionally, the microstructures in the first region and/or second region can be produced by laser processing the end face of the flange. Microstructures which can be produced by means of laser processing are free of geometric constraints. It is therefore possible to produce microstructures having positions and alignments that cannot be achieved using a milling cutter, which generates rotation bands.

According to another advantageous feature of the present invention, the blade shape can have a cross section in the shape of a triangle, a trapezoid or a trapezium. A triangular cross section represents the simplest shape that can be provided by a microstructure having a defined cutting line. The cutting line represents a linear contact which results in an increased Hertzian contact pressure and therefore an increased sticking friction. Alternatively or additionally, the microstructures can also have a trapezoid-shaped or trapezium-shaped cross section. If an end face is produced from a harder material than an opposing body for the flange connection, there is a reduced risk when using a trapezoid-shaped or trapezium-shaped cross section that material particles will break off from the end face and thus provoke stick-slip corrosion. In this case, trapezoid-shaped and trapezium-shaped cross sections have a narrow surface contact on their top side, offering a similar degree of sticking friction to a triangular cross section. Triangular, trapezoid-shaped and trapezium-shaped cross sections of the microstructures offer a defined direction-dependent increase of the local friction coefficient.

According to another advantageous feature of the present invention, the cutting line of the microstructure in the first region and/or second region can be aligned essentially transversely relative to a mechanical stress and/or an equivalent stress at the end face of the flange. In this case, the alignment can relate to a principal stress axis of a superimposed stress state at the corresponding location in the first region and/or second region. Alternatively, the alignment of the cutting lines of the microstructures can also relate to a correspondingly aligned and selected equivalent stress, e.g. a von Mises stress, i.e. a stress according to the distortion hypothesis, a Tresca, Coulomb, Saint-Venant, or Guest stress which is based on the shear stress hypothesis. Likewise, the alignment of the cutting lines of the microstructures can also relate to a Rankine stress which is based on the principal normal stress hypothesis. Other equivalent stresses according to the known hypotheses are also similarly possible. Such stresses and/or equivalent stresses can be easily calculated quickly and in high resolution using modern design programs, in particular CAD and FEM programs. A corresponding suitable alignment of the microstructures, in which a maximum increase of the local friction coefficient is achieved, can therefore be specifically produced in the first region and/or second region. Therefore the design of a housing component according to the present invention can be adapted effectively to different requirements.

According to another advantageous feature of the present invention, the mechanical stress relative to which the cutting lines of the microstructures are essentially transversely aligned can be a shear stress produced during operation. In this case, the shear stresses are those which occur at a flange connection between the flanges when they are pressed together during normal operation, e.g. in the context of a gear set, in particular a planetary gear set. The cutting lines of the microstructures therefore intersect at least sectionally with the direction which the shear stress assumes in the region of these microstructures, e.g. in an intermediate space between two microstructures. Shear stresses are algebraically derived from two present stresses using Mohr's circle for stress. Shear stresses can be calculated very easily and quickly by means of modern design programs, i.e. CAD and FEM programs. The invention is based inter alia on the finding that the greatest susceptibility to go from a sticking friction state to a sliding friction state exists in the region of increased shear stresses in a flange connection. Therefore those regions in which a loss of the sticking friction, and hence of the firm seating of the housing component, is most likely during normal operation can be identified particularly quickly by referring to the present shear stress as a criterion. Therefore, as a result of processing only a limited region on the end face of the flange, the entire flange is so developed as to be more stable by virtue of the microstructures.

According to another advantageous feature of the present invention, the microstructures can be arranged in the first region and/or second region, wherein a maximum mechanical stress which is higher than a selectable, i.e. settable, threshold value is present in the first region and/or second region. The threshold value can be set through user input or by an algorithm of a design program. By means of the selectable threshold value, it is possible to determine specific regions as first region and/or second regions in which microstructures must be formed. This ensures that under normal mechanical load of the flange, each region can be supported, i.e. reinforced, against slipping movement in the flange connection by means of microstructures. By means of suitable selection of the threshold value, it is possible specifically to identify the regions in which a microstructure produces an increase of the present sticking friction. The effort of producing the microstructures is therefore reduced to a minimum, such that a housing component according to the present invention can be produced quickly and economically.

According to another advantageous feature of the present invention, a torque bracket can be provided, with the first region and/or the second region being arranged at a transition zone to the torque bracket. The torque bracket can be advantageously molded to the housing component as a single piece, e.g. produced integrally by means of casting. The force due to weight of the housing component and e.g. of the gear set located therein is at least partly accommodated at the torque bracket. Furthermore, in the case of a planetary gear set, a deformation load is transferred by orbiting planet gears to its ring gear and from there to the associated housing component. In addition, an increase or decrease in stiffness occurs at the transition zone to a torque bracket in the housing component. The combination of this change in stiffness, the periodic orbiting deformation load and the static force due to weight results in increased mechanical stresses, in particular shear stresses, at the transition zone to a torque bracket. Consequently, the advantages outlined above in respect of a housing component according to the present invention are achieved to a large extent at the transition zone to a torque bracket.

According to another aspect of the present invention, a method for machining a housing component having a flange includes positioning a milling cutter at a first local center point of an end face of the flange, machining an end face of the flange to create a microstructure, and moving the milling cutter in a circumferential processing direction and in a radial processing direction from the first local center point to a second local center point while machining the end face.

In accordance with the present invention, a housing component is provided, wherein the end face of a flange must be machined. In a further step, a milling cutter is positioned relative to the housing component. A milling cutter axis about which the milling cutter rotates during operation is aligned essentially perpendicular to the end face. The milling cutter is positioned in such a way that the milling cutter axis passes through a first local center point. In a further step, machining of the end face of the flange is effected by means of the milling cutter. During the machining by the milling cutter, microstructures in the form of rotation bands are created on the end face of the milling cutter. In a further step, the milling cutter is moved from the first local center point to a second local center point. During the movement from the first to the second local center point, machining of the end face of the flange continues. The microstructures are created at a rear section of the milling cutter in relation to a direction of movement of the milling cutter. According to the invention, the movement of the milling cutter includes a movement in a circumferential processing direction and a movement in a radial processing direction. The circumferential processing direction in this case essentially follows the end face. The radial processing direction relates to a flange center point around which the end face extends.

A method according to the invention makes it possible to produce microstructures on an end face of a flange in a simple manner. In particular, the production is effected using only a tool which is already employed in the manufacture of gear sets, for example. The use of a special tool is therefore unnecessary. The position and the alignment of the microstructures can easily be set in a specific manner by controlling the milling cutter correspondingly. It is thus possible overall to produce a housing component which is able to support a greater mechanical load.

According to another advantageous feature of the present invention, the milling cutter can have a cutting diameter which exceeds a width of the flange, i.e. a radial dimension of the end face of the flange. It is thereby possible over the entire flange width to produce microstructures which cut across the end face in a manner ranging from arc-shaped to almost straight-lined. Using such a milling cutter, it is possible to produce almost constant microstructures on a surface, whereby a uniform direction-dependent increase of the local friction coefficient can be achieved in an entire segment of the end face. In particular, rapid machining of the end face is possible.

According to another advantageous feature of the present invention, at least one of the first local center point and the second local center point can lie radially outside the end face of the flange. It is thereby possible, e.g. when using milling cutters of increased diameter, precisely to set the curvature of the cutting lines of the microstructures produced on the end face. In particular, reduced curvatures of the cutting lines of the microstructures can be achieved at the edge of the end face. It is thereby possible using the claimed method to achieve greater design freedom in the layout of the microstructures, and the desired local increase of the friction coefficient can be set more precisely.

According to still another aspect of the present invention, a housing includes first and second housing components which are interconnected via a flange connection, each of the first and second housing components including a flange defining a center point and having an end face formed with microstructures in a first region and a second region to increase a local friction coefficient, the microstructures having each a blade shape with a cutting line, with the cutting line in the first region being arranged concentrically about a first local center point, and the cutting line in the second region being arranged concentrically about a second local center point, the first and second local center points having different radial distances from the center point of the flange.

A housing according to the present invention is used to accommodate a mechanical or electromechanical application, e.g. for a gear set or an electric motor. Components of the mechanical or electromechanical application are arranged in the housing, with the components being at least partly supported by the housing during normal operation. The housing includes a first housing component and a second housing component, each of which has a flange with an end face. The first and second housing components are frictionally connected to each other in a detachable manner by fastening means, e.g. screws of bolts, and form a flange connection. According to the invention, the first and/or the second housing component is developed in accordance with at least one of the embodiments described above. Such a housing offers increased sticking friction in the flange connection and is therefore suitable for accommodating increased supporting forces of components of the mechanical or electromechanical application and/or bearing pressures, while retaining the same structural size. At the same time, the sealing effect is increased in the flange connection. Furthermore, the at least one inventively designed housing component can be produced easily and economically.

According to another advantageous feature of the present invention, the cutting lines of the microstructures on the end faces can be arranged in parallel relation to each other in a reinforcing region. The region in which the cutting lines of the microstructures are developed parallel to each other therefore forms the reinforcing region. Parallel cutting lines of microstructures allow a reciprocal positive engagement, by means of which a further direction-dependent increase of the local friction coefficient is achieved. Such a reinforcing region offers a particularly high degree of sticking friction at locations where e.g. an increased mechanical stress, in particular shear stress, or equivalent stress is present. The technical advantages of the claimed housing component are thus achieved particularly effectively when it interacts with a further housing component which has been identically or similarly developed.

According to another advantageous feature of the present invention, the first housing component can be made from a material which is harder than a material of the second housing component, and the microstructure of the first housing component has a roughness which is greater than the microstructure of the second housing component. The microstructures on the end face of the flange of the first housing component have a greater roughness than the microstructures on the end face of the flange of the second housing component. A greater roughness in this context is produced by a larger dimension of the microstructures perpendicular to the corresponding end face. Such a combination of a first housing component having harder and rougher microstructures than are present on the end face of the second housing component represents a particularly advantageous combination, which realizes the intended advantages of the invention in a particularly effective manner.

According to yet another aspect of the present invention, a planetary gear set includes a ring gear, a planet gear rotatably arranged in the ring gear, and a housing including a housing component configured to accommodate the ring gear; the housing component including a flange defining a center point and having an end face formed with microstructures in a first region and a second region to increase a local friction coefficient, the microstructures having each a blade shape with a cutting line, the cutting line in the first region being arranged concentrically about a first local center point, and the cutting line in the second region being arranged concentrically about a second local center point, the first and second local center points having different radial distances from the center point of the flange.

In accordance with the present invention, the housing of the planetary gear set has at least a first housing component, with the ring gear, in which at least one planet gear runs during normal operation, being accommodated in the first housing component. To this end, the planet gear is rotatably mounted in a planet gear carrier. The planet gear creates bearing pressures which orbit with the planet gear in the ring gear. The bearing pressures are transferred from the ring gear to the first housing component. According to the invention, the first housing component is designed as per one of the embodiments variants described above. Such a planetary gear set makes it possible to adapt the present rotational speed in the event of increased torques. The technical advantages of a housing component according to the present invention are achieved in a planetary gear set.

According to yet another aspect of the present invention, a wind power installation, includes a nacelle, a planetary gear set including a ring gear, a planet gear rotatably arranged in the ring gear, and a housing including a housing component configured to accommodate the ring gear; the housing component including a flange defining a center point and having an end face formed with microstructures in a first region and a second region to increase a local friction coefficient, the microstructures having each a blade shape with a cutting line, the cutting line in the first region being arranged concentrically about a first local center point, and the cutting line in the second region being arranged concentrically about a second local center point, the first and second local center points having different radial distances from the center point of the flange, a generator, and a rotor connected to the nacelle and coupled in a torque transferring manner to the planetary gear set to drive a generator.

In accordance with the present invention, a wind power installation according to the present invention includes a rotor which is connected to a nacelle. The rotor is also connected via a gear set to a generator. The shaft power delivered by the rotor is increased by the gear set and the generator is thus provided with an increased rotational speed for the production of energy. The gear set in this case is designed as a planetary gear set in accordance with an embodiment outlined above. The planetary gear set offers an increased power density for the same structural size, i.e. a higher ratio of converted shaft power to structural volume. It is thereby possible to achieve a more compact implementation of the components in the nacelle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
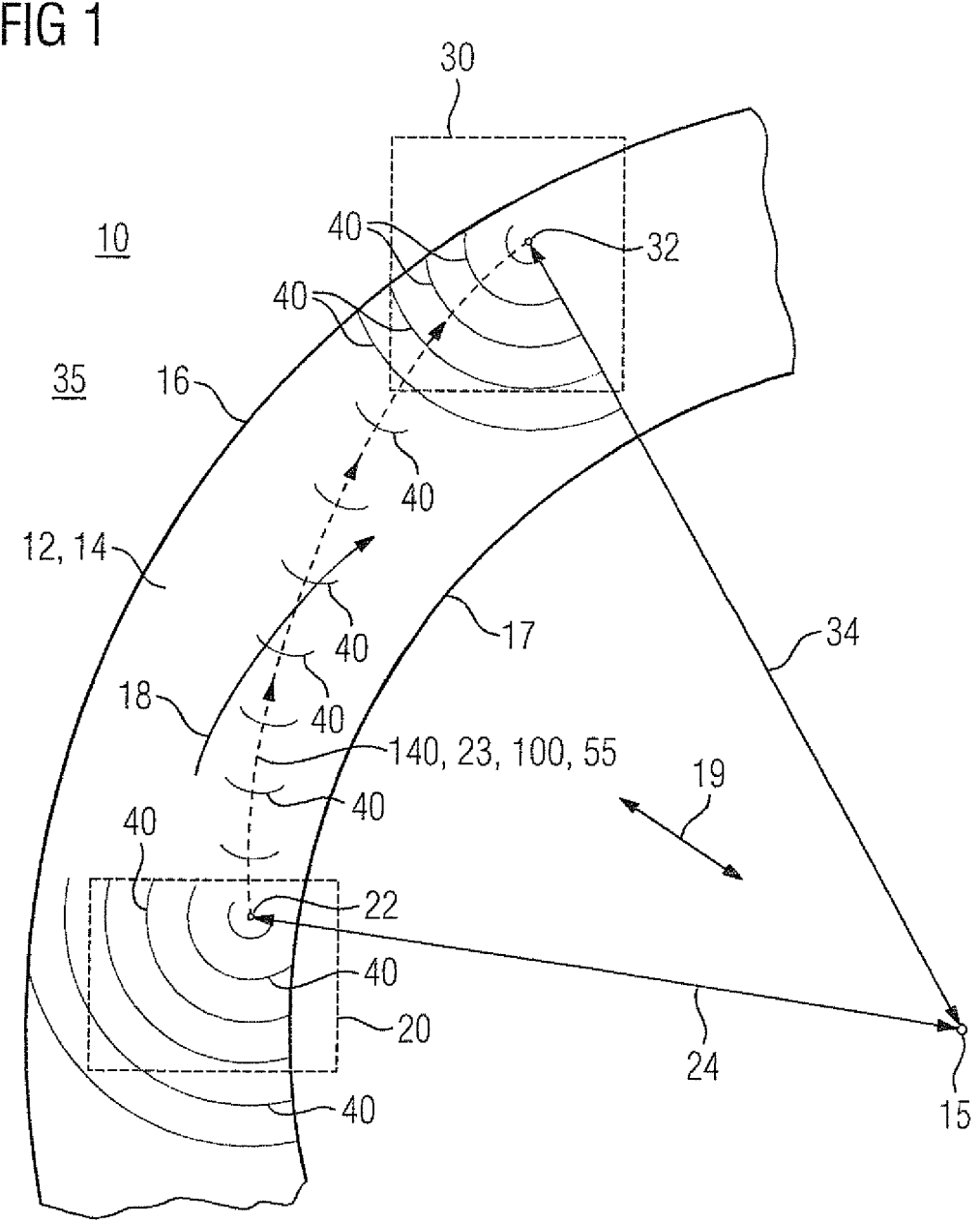
FIG. 1 shows a schematic illustration of a first embodiment of an end face of a flange of a housing component according to of the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a first embodiment of an end face 14 of a flange 12 of a housing component according to of the present invention, generally designated by reference numeral 10 and not illustrated in greater detail. The end face 14 is so formed as to continuously encircle the flange center point 15 once. The end face 14 and hence the flange 12 is annularly formed and, in conjunction with a further flange, serves to produce a frictional and tight-fitting flange connection 35. A plurality of microstructures 40 are formed in a first region 20 on the end face 14. The microstructures 40 have a curved form and are arranged concentrically relative to each other. The microstructures 40 in the first region 20 are grouped around a first local center point 22 and are arranged concentrically relative to the first local center point 22. The first local center point 22 lies on or above the end face 14 of the flange 12 in FIG. 1. The microstructures 40 have a convex form in an opposite sense to a circumferential processing direction 18 of the end face 14. The microstructures 40 overall form a set of curves. The first local center point 22 has a first radial distance 24 from flange center point 15. Due to the essentially concentric arrangement of the microstructures 40 about the first local center point 22, the first radial distance 24 is characteristic for the shape and alignment of the microstructures 40.

Figure 5:
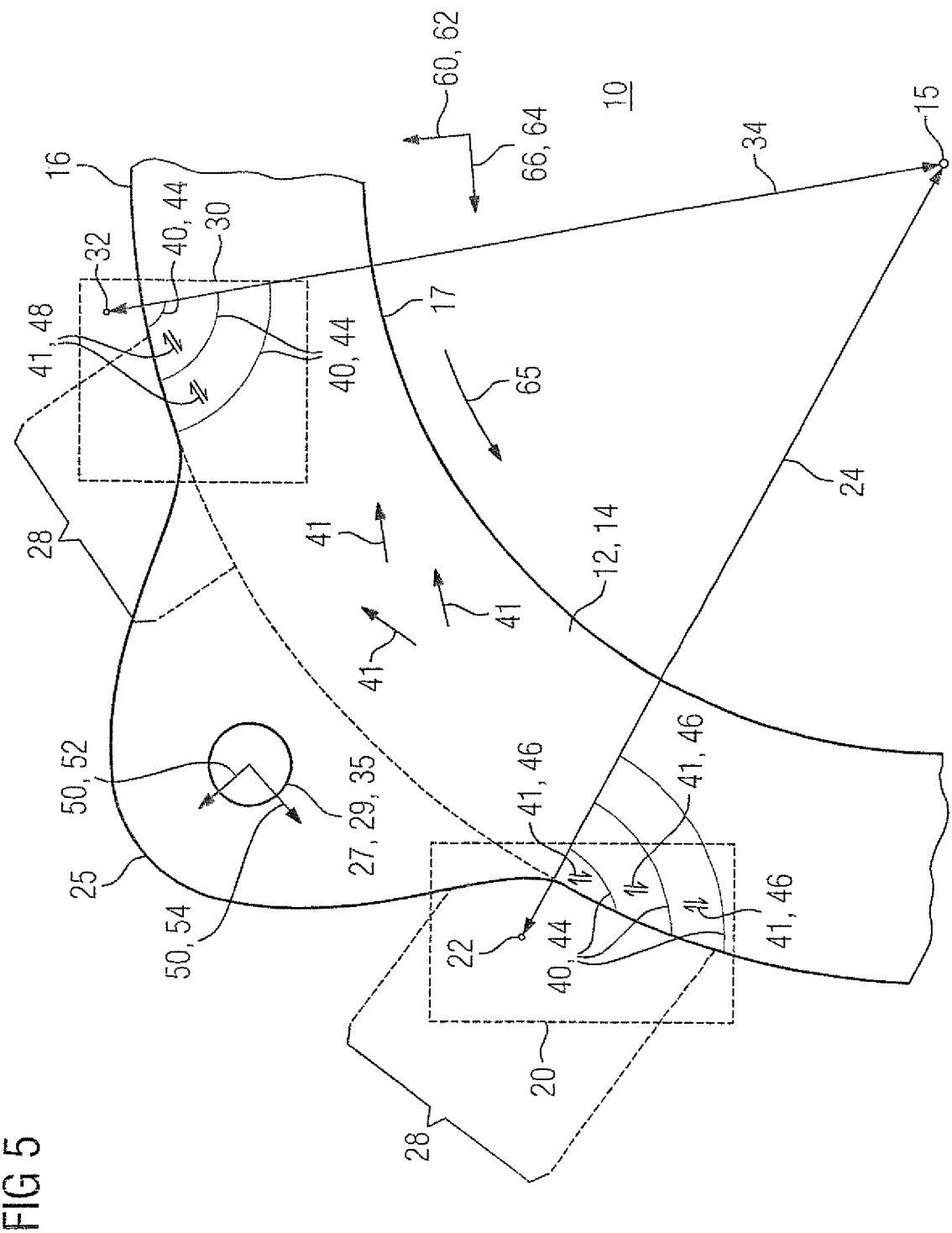
FIG. 5 shows a schematic illustration of a second embodiment of an end face of a flange on a housing component according to of the present invention.

A plurality of microstructures 40, also arranged concentrically relative to each other, is also formed in a second region 30 on the end face 14. The microstructures 40 in the second region 30 have a convex form in an opposite sense to a circumferential processing direction 18 of the end face 14. The microstructures 40 in the second region 30 are arranged concentrically about a second local center point 32. The second local center point 32 lies above or on the end face 14 and has a second radial distance 34 from the flange center point 15. The first radial distance 24 and the second radial distance 34 are different in terms of length. Therefore a different alignment relative to an outer edge 16 and an inner edge 17 of the flange 12 exists for the microstructures 40 in the first and second regions 20, 30. Between the first and second local center points 22, 32 is situated a processing path 23 which connects the local center points 22, 32. Further microstructures 40 are formed along the processing path 23 and have a crescent shape which intersects the processing path 23 essentially perpendicularly. The processing path 23 is traversed by a milling cutter 55, which is not shown in greater detail, in a fourth step 140 of a production method 100 as shown in FIG. 5, for example. The movement along the processing path 23 includes a circumferential processing direction 18 and a radial processing direction 19.

Figure 2:
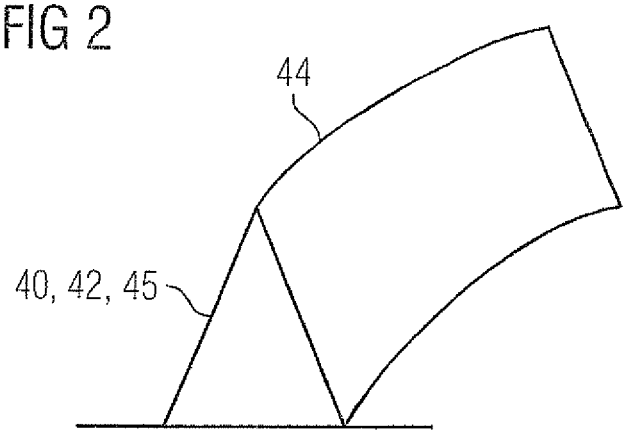
FIG. 2 shows a schematic view of a first variant of a microstructure.
Figure 3:
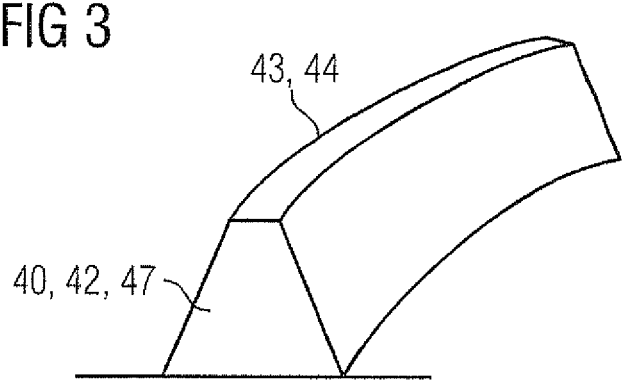
FIG. 3 shows a schematic view of a second variant of a microstructure.
Figure 4:
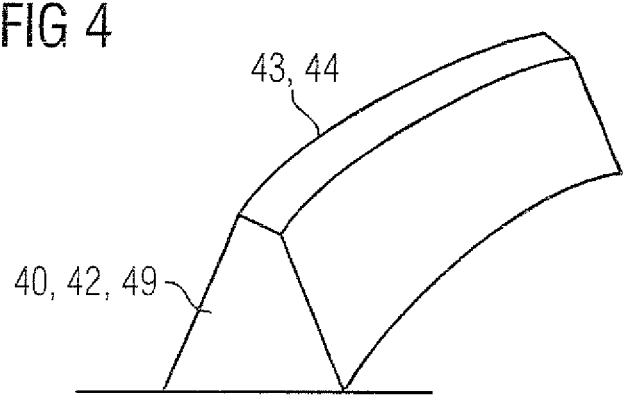
FIG. 4 shows a schematic view of a third variant of a microstructure.

A plurality of profiles of microstructures 40 which can be used to realize the inventive housing component 10 are depicted in FIG. 2 to FIG. 4. FIG. 2 shows a microstructure 40 which has a triangular cross section 45, wherein a point of the triangle forms a cutting line 44. The microstructure 40 featuring the triangular cross section 45 therefore has a blade shape 42. When in contact with another surface, the cutting line 44 provides a line contact at which an increased Hertzian contact pressure is present. This ensures a high degree of tightness. The microstructure 40 is so designed as to be curved and therefore the cutting line 44 has a curve or crescent shape.

FIG. 3 shows a microstructure 40 which has a blade shape 42 with a trapezoid-shaped cross section 47. Due to the dimensional magnitudes, a top side 43 of a microstructure 40 can also be considered as a cutting line 44. The top side 43 is designed to form a surface contact with an opposing body, which is not illustrated in further detail. The Hertzian contact pressure in a surface contact is weaker than in a line contact. There is consequently a reduced risk, when a load is applied and then released, of particles breaking off the microstructure 40 and possibly causing stick-slip corrosion.

Furthermore, FIG. 4 shows a microstructure 40 with a trapezium-shaped cross section 49, whereby a blade shape 42 is again realized. The trapezium-shaped cross section 49 has an inclined top side 43. An outline of the top side 43 forms a cutting line 44 here. The trapezium-shaped cross section 49 represents a transitional shape between the triangular cross section 45 and the trapezoid-shaped cross section 47. In microstructures 40 which are distributed in a planar manner as illustrated in FIG. 1 and FIG. 3, all three forms of cross section 45, 47, 49 are possible. As a result of plastic deformation, e.g. microstructures 40 with a triangular cross section 45 are also transformed into microstructures 40 with trapezoid-shaped or trapezium-shaped cross sections 47, 49.

FIG. 5 shows a flange 12 with its end face 14 in accordance with a second embodiment of the inventive housing component 10. The end face 14 surrounds a flange center point 15 and has an outer edge 16 and an inner edge 17. A torque bracket 25 is formed at the outer edge 16. The torque bracket 25 is essentially tongue-shaped and has an opening 27 for accommodating a fastening means, e.g. a retaining bolt 29. The housing component 10 is mounted at least via the torque bracket 25, such that bearing pressures 50 are introduced into the housing component 10 via the opening 27. The bearing pressures 50 include a radial force 52 and a tangential force 54. The housing component 10 is further subjected to an orbiting dynamic load 60 by integral gear set components. The dynamic load 60 has a dynamic radial force 62 and a dynamic tangential force 64. The rotation of these during operation is depicted by the arrow 65. An interaction of the bearing pressures 50 and the dynamic load 60 produces a temporally variable distribution of mechanical stresses in the end face 14 of the flange 12.

A first region 20, in which a plurality of microstructures 40 are arranged, is situated at a transition zone 28 to the torque bracket 25. The transition zone 28 and the first region 20 overlap each other at least partly in this case. The microstructures 40 in the first region 20 are essentially crescent-shaped and are arranged concentrically about a first local center point 22. The local center point 22 lies radially outside the end face 14 and determines the alignment of the associated microstructures 40 by virtue of its positioning. Maximum mechanical stresses 41 in the form of shear stresses 46 are also present in the first region 20. The alignment of the shear stresses 46 is illustrated by opposing arrow pairs. Cutting lines 44 of the microstructures 40 are aligned such that they lie essentially transversely relative to the shear stresses 46. As a result of this, the present friction coefficient is increased in a direction-dependent manner in the first region 20 and an increased sticking friction is thereby generated in the first region 20. The first housing component 10 in a flange connection 35 is thereby prevented from slipping. The shear stresses 46 or the point of their maximum represent the most meaningful physical variables for the mechanical load in the first region in terms of sticking friction or susceptibility to slipping. The present shear stress 46 can easily be determined for the end face 14 of the flange 12 by means of a design program, i.e. a CAD or FEM program.

Microstructures 40 are likewise arranged in a second region 30, being aligned such that their cutting lines 44 lie essentially transversely relative to an equivalent stress 41 that is caused by the present mechanical stresses 41 there. The equivalent stress 48 can be determined on the basis of data from a design program, e.g. a FEM program, by applying a selectable variant of the shear stress hypothesis, the distortion hypothesis, or a further equivalent stress theory. The equivalent stress 48 in the second region 30 is chosen such that the equivalent stress 48 for the present mechanical load in the second region 30 is most meaningful for the present sticking friction or susceptibility to slipping. The alignment of the cutting lines 44 of the microstructures 40 in the second region 30 is determined by the positioning of a second local center point 32, which lies radially outside the end face 14 in FIG. 3. A radial distance 34 of the second local center point 32 differs from the radial distance 24 of the first local center point 22 in this case.

Figure 6:
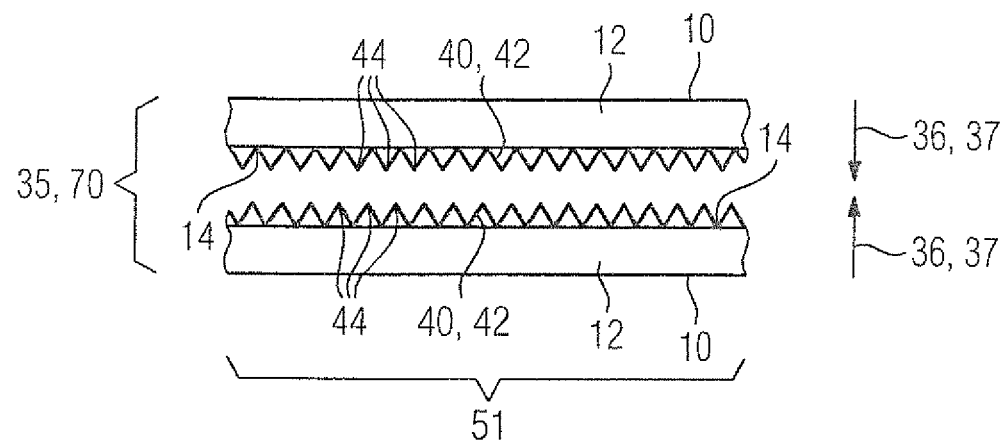
FIG. 6 shows a schematic view of a section of a housing according to the present invention.

FIG. 6 illustrates a cutout embodiment of a housing 70, in which housing components 10 must be frictionally coupled together via a flange connection 35. The housing components 10 are pressed together during assembly by means of a retention force 36 on their flanges 12. The retention force 36 is exerted via fastening means 37, in the form of screws, which are not illustrated in further detail. Microstructures 40 having a blade shape 42 are arranged at the end faces 14 of the flanges 12. The cutting lines 44 of the blade shapes 42 are aligned such that the cutting lines 44 of the microstructures 40 of both housing components 10 are aligned parallel to each other. When the microstructures 40 intermesh, the cutting lines 44 form a positive engagement at the microstructures 40 in each case. A significant increase of the friction coefficient is thereby achieved at the corresponding location. A reinforcing region 51 is thereby formed.

Figure 7:
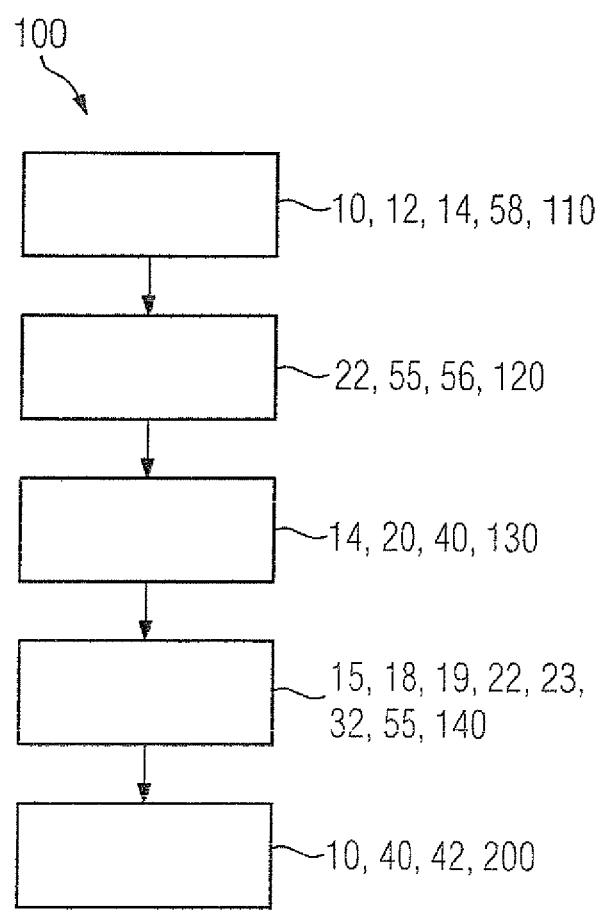
FIG. 7 schematically shows a sequence diagram of a production method according to the present invention.
Figure 8:
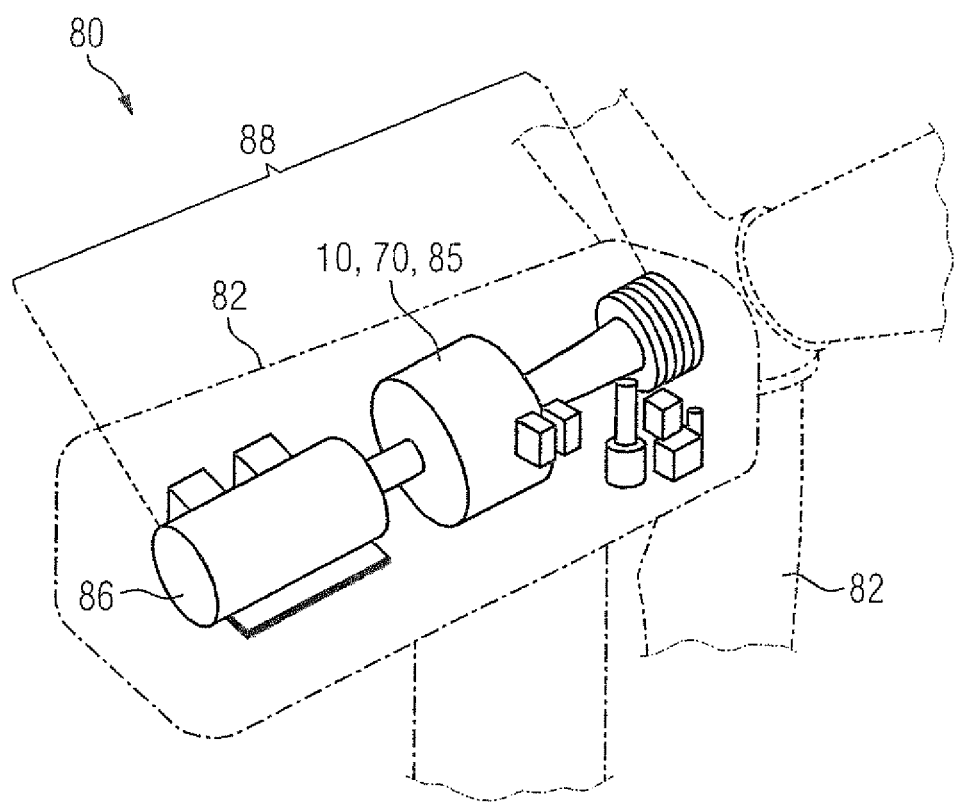
FIG. 8 shows a perspective view of a wind power installation according to the present invention.

FIG. 7 schematically shows a sequence of an embodiment of the inventive production method 100 for a housing component 10. The housing component 10 is initially provided as an unmachined part which has a flange 12 with an end face 14 that is to be processed by machining. In a first step 110, the housing component 10 having the flange 12 with the end face 14 is provided and is clamped into a corresponding processing machine 58, e.g. a milling machine, which is not illustrated in greater detail. In a second step 120 following thereupon, a milling cutter 55 is positioned at a first local center point 22. In this case, a milling cutter axis 56 about which the milling cutter 55 rotates during processing is essentially perpendicular to the end face 14. This is followed by a third step 130 in which machining of the end face 14 takes place and the microstructures 40 are generated in a first region 20 on the end face 14. The first region 20 is the immediate surroundings of the local center point 22. In a fourth step 140, the milling cutter 55 is moved from the first local center point 22 to a second local center point 32. During the movement to the second local center point 32, the milling cutter 55 remains in contact with the end face 14, such that the machining of the end face 14 which commenced in the third step 130 is continued. As a result of the movement of the milling cutter 55, essentially crescent-shaped rotation bands are thus generated on the end face 14 and serve as microstructures 40 for the purpose of locally increasing a friction coefficient. Rotation bands form microstructures which have essentially a blade shape 42, and are therefore suitable for increasing a local friction coefficient in a direction-dependent manner. When moving from the first to the second local center point 22, 32, the milling cutter follows a predefined processing path 23. The movement of the milling cutter 55 includes a circumferential processing direction 18 and a radial processing direction 19 on the processing path 23. It is consequently possible to set the alignment of the microstructures 40 that are generated. There follows a final state 200 in which a housing component 10 is available whose end face 14 is populated with microstructures 40 that have essentially a blade shape 42 and are arranged in the shape of crescents concentrically about local center points 22, 32.

Furthermore, FIG. 6 shows an embodiment of an inventive wind power installation 80 which has a rotor 82 arranged on the windward side. The rotor 82 is coupled in a torque transferring manner to a gear set 85 having the form of a planetary gear set. The gear set 85 in turn is connected in a torque transferring manner to a generator 86, which is designed to generate electrical energy. The gear set 85 and the generator are accommodated in a nacelle 84 and form part of a drive train 88 of the wind power installation 80. The gear set 85 has a housing 70 which includes at least one housing component 10. The housing component 10 is developed in accordance with an embodiment of the present invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A housing component, comprising a flange defining, a center point and having an end face formed with microstructures in a first region and a second region to increase a local friction coefficient, said microstructures having each a blade shape with a cutting line, the cutting line in the first region being arranged concentrically about a first local center point, and the cutting line in the second region being arranged concentrically about a second local center point, the first and second local center points having different radial distances from the center point of the flange and a processing path extending in a circumferential processing direction and a radial processing direction connecting said first and second local center points, said processing path comprising further said microstructures.

2. The housing component of claim 1, wherein the microstructures are at least partly formed as rotation bands and/or produced by laser processing.

3. The housing component of claim 1, wherein the blade shape has a cross section in the shape of a triangle, a trapezoid or a trapezium.

4. The housing component of claim 1, wherein the cutting line of the microstructure in the first region and/or the second region is aligned transversely relative to a mechanical stress and/or an equivalent stress at the end face of the flange.

5. The housing component of claim 4, wherein the mechanical stress is a shear stress produced during operation.

6. The housing component of claim 4, wherein the mechanical stress is at a maximum when exceeding a selectable threshold value in the first region and/or second region during operation.

7. The housing component of claim 1, further comprising a torque bracket, the first region and/or the second region being arranged at a transition zone to the torque bracket.

8. A method for machining a housing component having a flange, said method comprising:
    positioning a milling cutter at a first local center point of an end face of the flange;
    machining the end face of the flange to create a microstructure; and
    moving the milling cutter along a processing path in a circumferential processing direction and in a radial processing direction from the first local center point to a second local center point while machining the end face; and
    generating further microstructures along the processing path.

9. The method of claim 8, wherein the microstructures are formed as rotation bands.

10. The method of claim 8, wherein the milling cutter has a cutting diameter which exceeds a width of the flange.

11. The method of claim 8, wherein at least one of the first local center point and the second local center point lies radially outside the end face of the flange.

12. A housing, comprising first and second housing components which are interconnected via a flange connection, each of the first and second housing components comprising a flange defining a center point and having an end face formed with microstructures in a first region and a second region to increase a local friction coefficient, said microstructures having each a blade shape with a cutting line, the cutting line in the first region being arranged concentrically about a first local center point, and the cutting line in the second region being arranged concentrically about a second local center point, the first and second local center points having different radial distances from the center point of the flange and a processing path extending in a circumferential processing direction and a radial processing direction connecting said first and second local center points, said processing path comprising further said microstructures.

13. The housing of claim 12, wherein the cutting lines of the microstructures on the end faces are arranged in parallel relation to each other in a reinforcing region.

14. The housing of claim 12, wherein the first housing component is made from a material which is harder than a material of the second housing component, and the microstructure of the first housing component has a roughness which is greater than the microstructure of the second housing component.

15. A planetary gear set, comprising:
    a ring gear;
    a planet gear rotatably arranged in the ring gear; and
    a housing including a housing component configured to accommodate the ring gear; said housing component comprising a flange defining a center point and having an end face formed with microstructures in a first region and a second region to increase a local friction coefficient, said microstructures having each a blade shape with a cutting line, the cutting line in the first region being arranged concentrically about a first local center point, and the cutting line in the second region being arranged concentrically about a second local center point, the first and second local center points having different radial distances from the center point of the flange and a processing path extending in a circumferential processing direction and a radial processing direction connecting said first and second local center points, said processing path comprising further said microstructures.

16. A wind power installation, comprising:

a nacelle;

a planetary gear set comprising a ring gear, a planet gear rotatably arranged in the ring gear, and a housing including a housing component configured to accommodate the ring gear; said housing component comprising a flange defining a center point and having an end face formed with microstructures in a first region and a second region to increase a local friction coefficient, said microstructures having each a blade shape with a cutting line, the cutting line in the first region being arranged concentrically about a first local center point, and the cutting line in the second region being arranged concentrically about a second local center point, the first and second local center points having different radial distances from the center point of the flange and a processing path extending in a circumferential processing direction and a radial processing direction connecting said first and second local center points, said processing path comprising further said microstructures;

a generator; and a rotor connected to the nacelle and coupled in a torque transferring manner to the planetary gear set to drive a generator.

* * * * *